Dec. 8, 1936.   C. T. RAY   2,063,852
TILLAGE IMPLEMENT
Filed July 15, 1932   6 Sheets-Sheet 5

Inventor
Charles T. Ray
By C. J. Stockman
Attorney

Patented Dec. 8, 1936

2,063,852

UNITED STATES PATENT OFFICE 2,063,852

TILLAGE IMPLEMENT

Charles T. Ray, Louisville, Ky., assignor to B. F. Avery & Sons Company, Louisville, Ky., a corporation of Delaware Application July 15, 1932, Serial No. 622,760

33 Claims. (Cl. 97—230)

In an application for Letters Patent of the United States filed by me December 29, 1930 and numbered serially, 505,416, and which during the pendency of the instant application matured into Patent numbered 1,885,763 and dated November 1, 1932, I have shown, described and claimed a tractor propelled tillage implement for two-row row crop operations in which the beams which carry the soil-working elements extend beneath the body of the tractor and are provided at their forward ends with gage wheels and flexibly connected by forwardly extending links to supporting elements carried by the tractor, near the front end of the latter. The implement referred to also includes levers which are settable into anyone of a plurality of positions and are so connected with said beams as to be operative to variably regulate the depth of penetration of the soil-working elements carried by the beams. In the application referred to, and in the instant application, the tillage implement constitutes an attachment to the tractor and said tractor is provided with a clutch and adjunctive elements under control of the operator of the tractor for raising the implement from working to transport position and lowering it from transport to working position.

The instant invention particularly relates to a marker mechanism (whose marking device, proper, may be of the type which acts upon the unplowed land or, equivalently, in the previously formed furrow, whichever is preferred), herein shown as being applied to a seed planter of the kind shown in my before mentioned application and the patent which issued upon said application, it being, in fact, one of the important objects of the invention to provide a marker mechanism applicable to an implement of the type set forth in said application and patent, and, more particularly, to provide a marker and raising means therefor including a lever pivoted between its ends to oscillate about a fixed axis at the front end of the implement and operating connections between one end of said lever and a power lift means and between the other end of said lever and the marker.

Another important purpose of the invention is to provide a marker mechanism characterized in that its marker carrying arm, while being so connected with the implement that it will be automatically raised to inoperative position simultaneously with the raising of the soil treating means from working position is, at the same time, held in its inoperative position by a latching means comprising relatively movable members and operating connections which permit the soil treating means to be lowered to operative position without releasing said latching members from their latching engagement with each other and hence without releasing the marker arm from the holding relationship of the latching means therewith, whereby said arm is permitted to remain in its raised position while the soil treating means is being lowered.

The invention consists of certain novel combinations and arrangements of elements by which the foregoing purposes, and others which will be apparent to those familiar with this class of mechanisms, may be carried out, substantially as hereinafter set forth in the following description and claims.

In the accompanying drawings illustrating the preferred embodiment of the invention and wherein like characters of reference denote corresponding parts in the several views, and in which the tractor wherever shown is depicted in dot-and-dash outline, except as to certain parts which are added thereto for its use in raising and lowering the planting attachments:

Fig. 12 is a detail view of a part of the side of the tractor opposite that seen in Figs. 1–4, inclusive, and is particularly intended to show a clutch and adjunctive elements for raising and lowering the planter from and into ground-working position.

A designates a tractor and B, B, designate two planting attachments which are connected to said tractor. The tractor and the planting attachments are arranged for row crop operation. The front and rear ends of the tractor are supported by carrying wheels 10 and 11, said wheels 10 being at the front end of the tractor and arranged adjacent each other and close to the transverse center of said end, and the wheels 11 being widely spaced from each other at the rear end of the tractor. The planting attachments are arranged between the wheels 11 and extend for a considerable distance underneath the frame of the tractor and are connected to said tractor near the front end of the latter, instead of occupying a trailing relationship to the tractor.

The tractor illustrated in dot-and-dash outline is provided with certain additional parts, shown in full lines, to enable it to be employed for the purposes of the present invention without interfering with its utility for general farm purposes. Among the said parts is a bail comprising a member 12 from whose opposite ends arms 13 extend rearwardly. The member 12 of this bail extends transversely of the tractor and is journalled in suitable bearings carried by the latter. The side arms 13 of the bail have their free ends adapted for connection with the respective planting attachments. The means here shown for connecting them with said attachments are in the form of chains 14 but any suitable means may be substituted for said chains, if desired. Each arm of the bail is also provided with upwardly extending projections 15, 16 for purposes hereinafter set forth. The projections 15, 16 of each bail arm are preferably formed as integral parts of a supporting member 17 which is secured to the corresponding bail arm in any suitable way.

Each planting attachment in the illustrated embodiment of the invention is designed for listering and planting. Since they are of identical construction the following description of one will be understood to apply equally to the other, to wit:

18 designates an appropriate beam whose rear end is formed to provide a curved downward extension 18' to which a middleburster plow body 19 is suitably secured. 20 designates a seed hopper carried by arms 21 suitably attached to the beam. Seed dropping mechanism of any suitable nature, not necessary particularly to show or describe herein, is operatively associated with said hopper to control the discharge of seed therefrom into a seed chute 22 having an extension 22' for the discharge of the seed. An opener 23 is arranged rearward of the middleburster 19 and immediately in advance of said extension 22' and seed coverers 24 are mounted rearward of the chute extension 22 and rearward of said chute extension is a press wheel 25. The illustrated press wheel is of the open type, but any suitable type or construction of press wheel may be employed. The hopper supporting arms 21 and the seed chute 22 and its extension 22' are carried by or from the beam 18 by any suitable means, the means shown including brackets 26 of appropriate construction suitably secured to the beam 18 near the upper end of the downward extension 18' of said beam. The openers 23 may be of any suitable type. The seed coverers 24 are shown as supported by an arm 27 whose upper end is mounted upon a rearward projection 28 secured in any suitable way to the downward extension 18' of the beam. The seed dropping mechanism, which may be of any suitable nature, includes a gear 29 which derives motion from the corresponding press wheel 25 and transmits said motion to the parts of the seed dropping mechanism which control the flow of seeds from the hopper 20 into the chute 22. In the illustrated embodiment the gear 29 is connected with a gear 30 on the axle of the corresponding press wheels, by chains 31.

A gage wheel 32 is arranged at the front end of the beam 18, upon a lateral extension from the lower end of a crank arm 33 whose upper end is bent to provide a lateral extension, which forms a pivot 33'. This pivot 33' is journalled in an appropriate bearing 34 suitably secured to the front end of the beam 18 and is provided with a crank arm 35 whose lower end is connected by a link 36 with the lower end of a depth regulating lever 37. This lever 37 is fulcrumed at 37' upon the beam 18 and is provided with a spring-pressed latch 38 which cooperates with a toothed segment 39 in holding the lever and gage wheel in their adjusted positions. Each later is connected by a rod 40 with an appropriate operating element 41 arranged adjacent the grip portion of the handle.

It will be understood that when the lever 37 is moved about its fulcrum at 37' the crank arm 33 will be moved correspondingly, in clockwise or counterclockwise direction according to the direction of movement given said lever 37, and will correspondingly raise or lower the beam 18, thereby regulating the depth at which the plow body 19, opener 23 and coverers 24 will operate.

Movement of each planting attachment in following the contour of the land is from the pivot 33' formed by the lateral extension at the upper end of the supporting arm 33 of the gage wheel as the axis of such movement.

Figure 4:
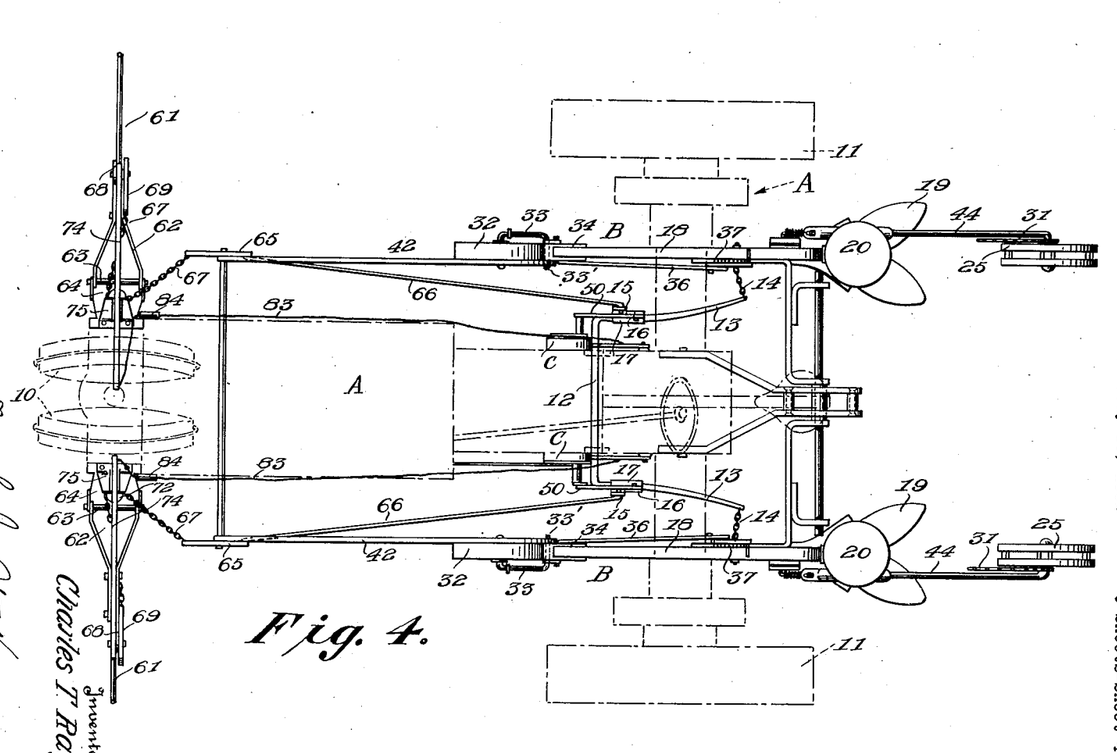
Fig. 4 is a plan view of the tractor and planter and marker.

As thus far described, each planter is of a construction and type for which no novelty is claimed and to any detail of which the invention is not restricted. It may also be here mentioned that in practice the planters are suitably connected with each other by a means which restrains them against relative sidewise movement. This means is preferably of a construction adapted to permit the two planting attachments to move relatively to each other in accord with the contour of the land traversed by the respective gage wheels. A means of the nature referred to is illustrated in my aforesaid application for Letters Patent and the patent issued upon said application. Since such means forms no claimed part of the present invention, it is not necessary to describe it in detail herein, but it is shown in Fig. 4.

Each planting attachment is provided with a draft link 42 whose rear end is pivotally connected with the forward end of the beam and whose forward end is pivotally connected with the tractor near the forward end of the latter. It is preferred in practice to mount the rear end of the draft link 42 upon the lateral extension 33' of the gage wheel carrying arm 33 and to mount the front end of said draft link upon a pivot 43 secured to an appropriate part of the tractor by which it will be held against up and down movements relatively to the tractor.

Each press wheel 25 is mounted at the lower end of a supporting arm or rod 44 journalled in a bracket 45 suitably secured to the upper end of the downwardly curved extension 18' of the corresponding beam 18.

The tractor is provided with a clutch C (shown in Fig. 13) which is operated, under control of the operative of the tractor, to swing the bail arms 13 in clockwise and counterclockwise directions, intermittently and by power derived from an appropriate part of the tractor. The clutch is of a type which includes a driving member and a driven member, together with a suitable operating lever (such as pedal c, for example) for moving said members relatively to each other into a clutching relationship and automatically locking them together when they have been so moved and for automatically releasing them from each other when they have completed their unitary movement throughout the distance requisite to move the corresponding planting attachments from working to transport position or from transport to working position, as the case may be.

The elements of clutches of this type are so arranged that when their driving and driven members have been brought into a clutching relationship, one with the other, they remain in such relationship throughout one-half of a complete revolution and are then automatically disengaged and when again brought into a clutching relationship remain therein throughout the remaining one-half of a complete revolution. The driven member of the clutch is connected by a link 50 with the ear 15 projecting from the corresponding bail-arm 13, and a like link 52 at the side of the tractor opposite the clutch has its lower end pivoted to the ear 16 projecting from the bail-arm 13 at the latter side of the tractor and its upper end pivoted to a crank arm 51 which derives motion from the driven member of the clutch to which it is connected in any suitable way. A description of the details of the clutch and of the connection of the crank arm 51 therewith, and also of the pedal-operated means under control of the operator of the tractor for connecting the driven member of the clutch to the driving member is deemed to be unnecessary herein since said details are not claimed in the present application. It may be mentioned, however, that they are shown and described in a co-pending application for a farm tractor, designated "Case C".

Figures 1, 11:
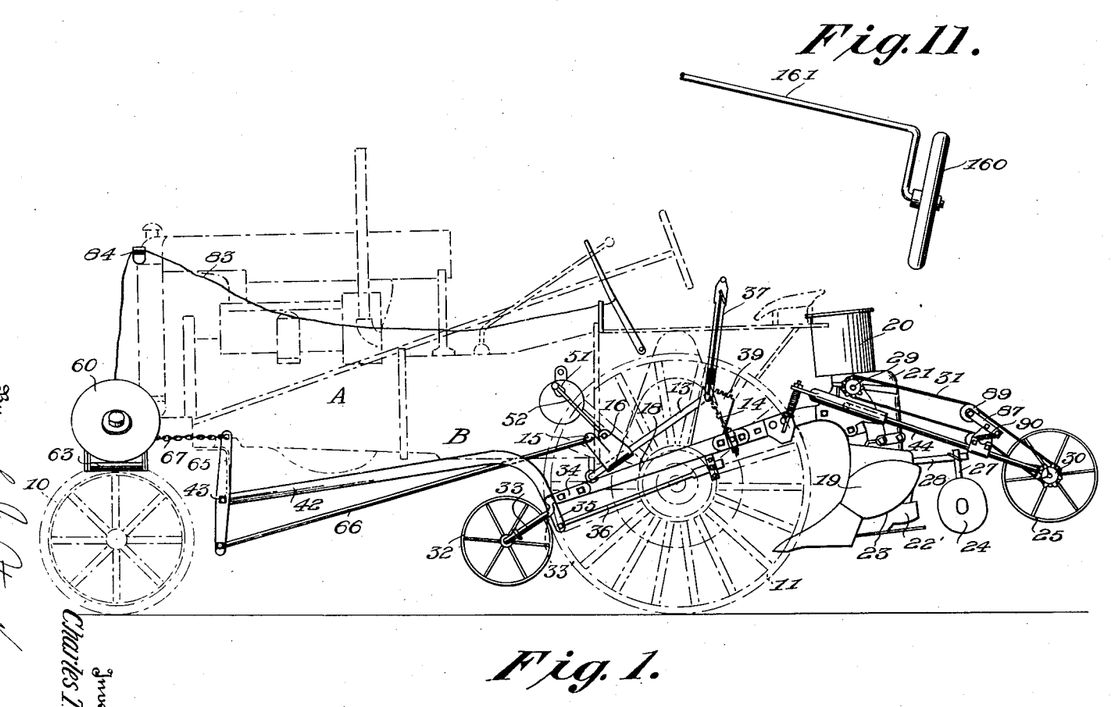
Figs. 1, 2 and 3 are side elevations of a tractor and a seed planter and marker, showing the planter and marker in different positions—Fig. 1 showing said planter and marker in transport position, Fig. 2 in position for the plow bodies to enter the soil and Fig. 3 in actual working position within the soil.
Fig. 11 is a detail representation of a marker of wheel form which may be employed in lieu of the disk shown in the preceding figures.
Figures 1B, 3:
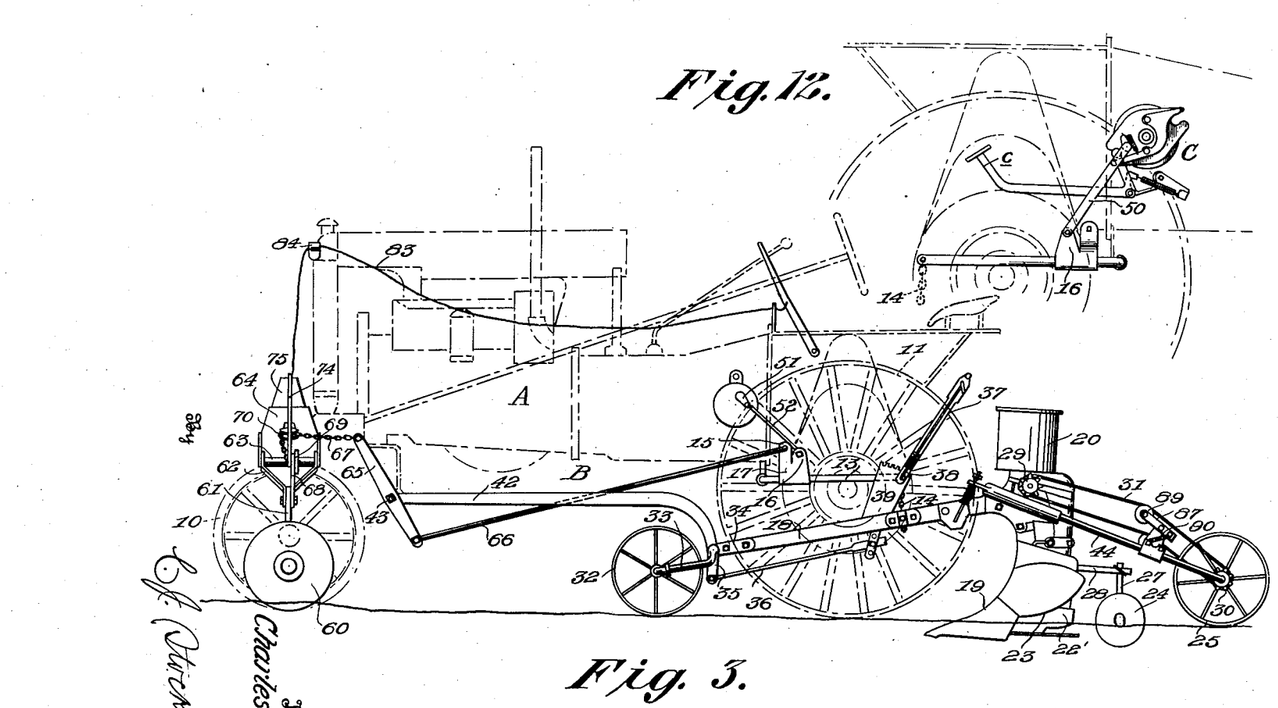
Figures 2, 7:
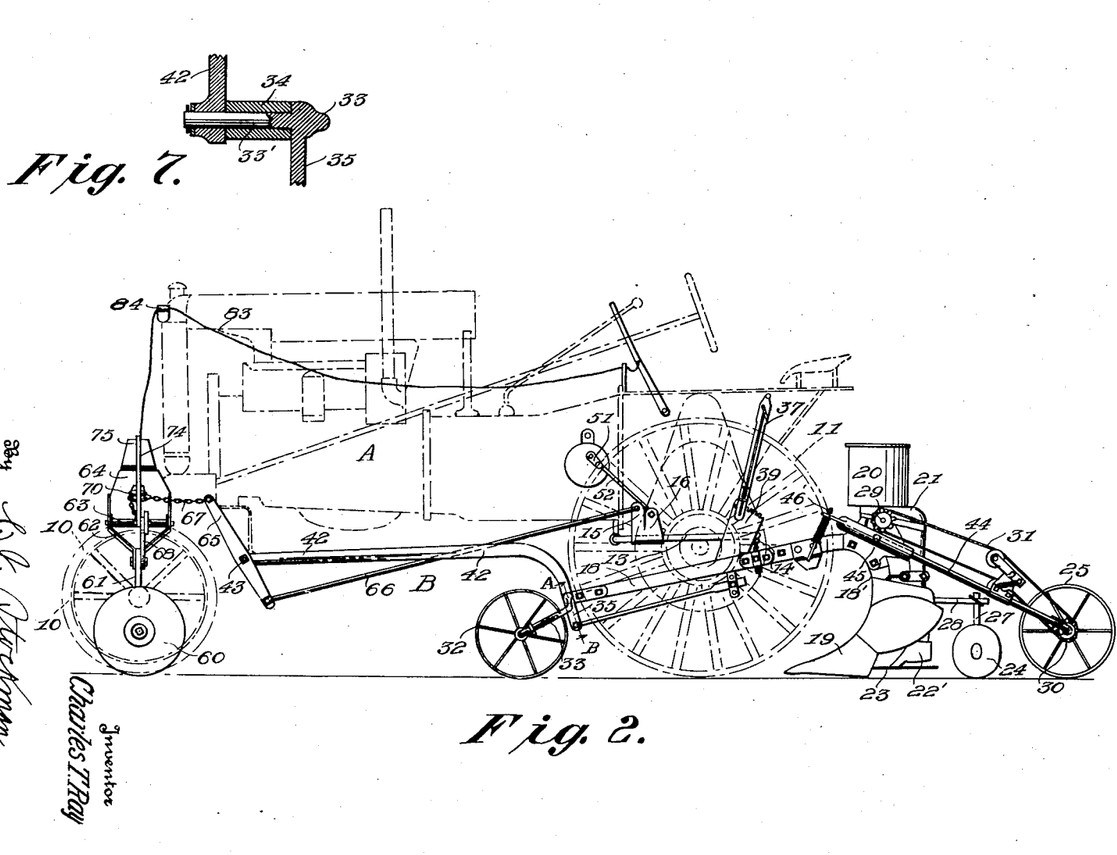
Fig. 7 is a detail view to show the pivot connecting a gage wheel to the front end of the corresponding beam, and also to show certain elements which are connected to said pivot.

Thus it will be seen that if the planting attachments are in working position, shown in Fig. 3, and it is desired to raise them to transport position, shown in Fig. 1, it will be necessary only for the operator to press upon the pedal c, thereby initiating rotative movement of the clutch which movement will be in a direction which will swing the bail-arms counterclockwise, thereby raising the planting attachments completely off the ground. When the planting attachments are in their raised position and it is desired to lower them to working position, the operator again presses upon the pedal c, thereby initiating movement of the clutch which is transmitted to the bail-arms in a downward direction, whereupon the planting attachments, which are suspended from the free ends of said bail-arms, will descend into their working position. These movements of the planting attachments between transport and working positions are about the pins 43 as the axis of such movement. As already stated, the movements of the planting attachments in up and down directions in following the contour of the land traversed by the gage wheels 32 are about the pivots 33' formed by a lateral projection in the upper end of the arm 33, and it will be noticed in this connection that the chains 14 are of a nature which permits such movements of the planting attachments without imparting corresponding movement to the bail-arms. It may also be here mentioned that the connections between the draft links 42 and the tractor may be such as to permit sidewise swaying movements of the tractor in following the contour traversed by its wheels 11 without imparting corresponding movements to the planting attachments. In short, the connections between the planting attachments and the tractor provide the full flexibility which is highly desirable in implements of this nature.

60, 60 designate two rotatable markers respectively mounted on the lower ends of arms 61 whose upper ends are pivotally mounted on opposite sides of the front end of the tractor. Each marker 60 is of disc form with sharpened edges and in operation the one at the side of the implement which is adjacent the unplowed land is lowered into a position in which it will run on said unplowed land and will cut therein a line which will guide the operator in forming the next succeeding furrow; the marker on the opposite side of the implement being at this time in its raised and hence inoperative position. Each arm 61 projects laterally in a downward direction from its upper, pivoted, end when the marker is in operative position. As a means by which its upper end may be pivotally attached to the tractor, each arm preferably has its said upper end provided with a yoke 62 which is rigidly secured to the arm and has the free ends of its side arms pivotally mounted at opposite ends of a pin 63 carried by an appropriate bracket 64 fixedly secured to the corresponding side of the tractor frame.

65 designates a lever which is pivoted between its ends on the pin 43 which supports the front end of the draft link 42. From one end of this lever 65 a link 66 extends rearward to the ear 15 at the corresponding side of the bail-arm 13. It will be understood that there is one of said levers 65 and links 66 at each side of the implement. The upper ends of the levers 65 are connected, respectively, with the arms 61 by means which include chains 67, upward projections 68 from the arms 61 and connectors 69 between said chains and projections. Each chain 67 is secured at one end to the upper end of the corresponding lever 65 and passes, over a guide pulley 70, to the end of the corresponding connector 69, to which it is attached in any suitable way. The opposite end of each connector is provided with a plurality of perforations 70' in any one of which a pin 71 carried by the corresponding projection 68 may be inserted to thereby pivotally connect said arm and connector with each other. Each of these projections 68 is fixedly secured at its lower end to the corresponding arm, 61 and each of the guide pulleys is preferably journalled in a yoke 72 which is pivotally connected at 73 to the adjacent bracket 64.

The markers 60 are held against falling movement while the planting attachments are being lowered from transport to working position by appropriate latching means. The latching means exemplified in this application are respectively brought into holding relationship with the arms of said markers under control of the means for lowering the planting attachments and are held in such relationship until released by the operator of the tractor. The illustrated latching means includes, for each arm 61 a latching arm 74 which extends transversely of the implement and is arranged at the front end of the tractor and has its outer free end mounted upon the corresponding pin 71 carried by the projection 68 from the arm 61 at the corresponding side of the implement. Each latching arm is associated with an appropriate keeper. As here shown, each keeper comprises a body member 75 having an opening 76 through which the corresponding latching arm 74 extends and is provided, within said opening, with a member to engage and hold the latching arm. The member referred to preferably is provided by a pin 77 upon which is mounted a roller 78 adapted to be received within a recess 79 formed in the lower edge of the latching arm. The body members 75 of the keepers are provided at their lower ends with flanges 80 through which appropriate fastening elements extend to secure them to the frame of the tractor adjacent the opposite ends of the latter, as shown best in Fig. 5. Each of the body members is preferably stamped from sheet metal formed, at opposite sides of its opening 76, with flanges 81, in which opposite ends of the pin 77 are mounted, said flanges also providing broadened surfaces which are arranged to have flatwise engagement with the side surfaces of the latching arm to thereby exercise a guiding function with respect to said arm in the movements of the latter through the opening 76. A pin 82, also attached to the flange 81 and crossing the opening 76 above and normally spaced from the upper edge of the arm 74 serves as a stop to prevent upward movement of said arm within the opening beyond the limit predetermined by the position of said pin.

When the planting attachments are in their raised (transport) position, the marker arms will be held in elevated position by the bail-arms 13, links 66, levers 65 and chains 67 and projections 68. At this time, the upper ends of the levers 65 are in their rearward positions and the chains 67 are taut and operate to hold the respective latching arms 74 out of latching engagement with the corresponding keeper-rollers 78.

When said bail-arms are swung to cause the planting attachments to be lowered to working position the upper ends of the levers 65 are moved forward thereby slackening the chains 67 and permitting the respective marker arms 61 to move toward their operating positions until the latching arms 74 which are connected therewith are brought into latching engagement with the keeper rollers 78. This movement may be very slight. The latching arms are held in latching engagement with the respective keeper rollers 78 until released by the operator on the seat of the tractor. When the planting attachments have been lowered to their working position, the latching arm 74 connected to the particular marker which is to be employed is released by the operator, thereby permitting the selected marker to fall by gravity. This release is effected through the medium of a cable, a cord or other connector, 83, preferably of flexible nature, which extends through a guide 84 within convenient reach of the operator on the seat of the tractor.

While the bail-arms 13 are in movement in clockwise direction and thereby raising the planting attachments, said bail-arms are also operating, through the link 66, lever 65, chain 67, connector 69 and projection 68 to raise the particular marker arm which was in use. In this movement the corresponding latching arm 74 is moved relatively to the latch keeper into a position in which it will be adjacent but non-operatively connected to the keeper-marker 78.

Figures 5, 8, 9, 10:
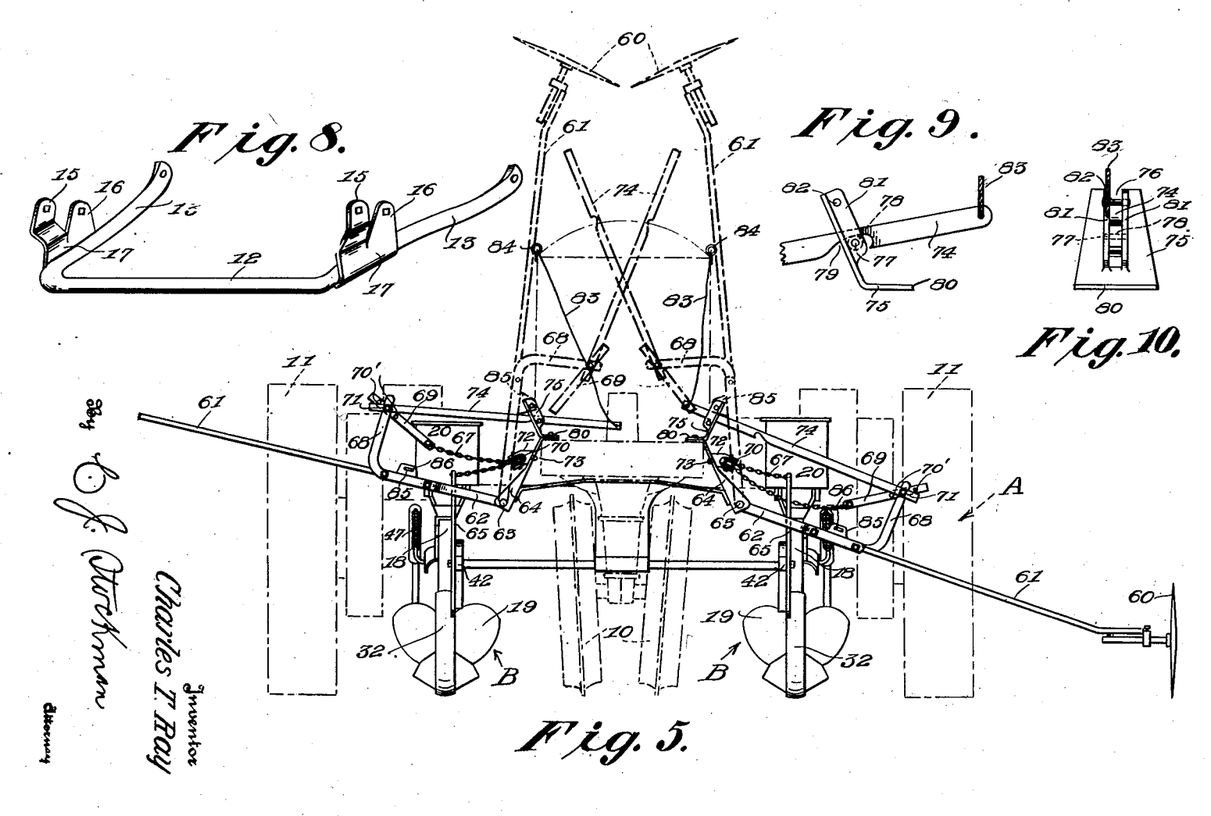
Fig. 5 is a front elevation, showing the parts in the positions in which they are seen in Fig. 2.
Fig. 8 is a detail representation of the lifting bail.
Fig. 9 is a detail representation of a part of the latching arm and its keeper for the corresponding marker.
Fig. 10 is a front elevation of the parts shown in Fig. 9.
Figure 6:
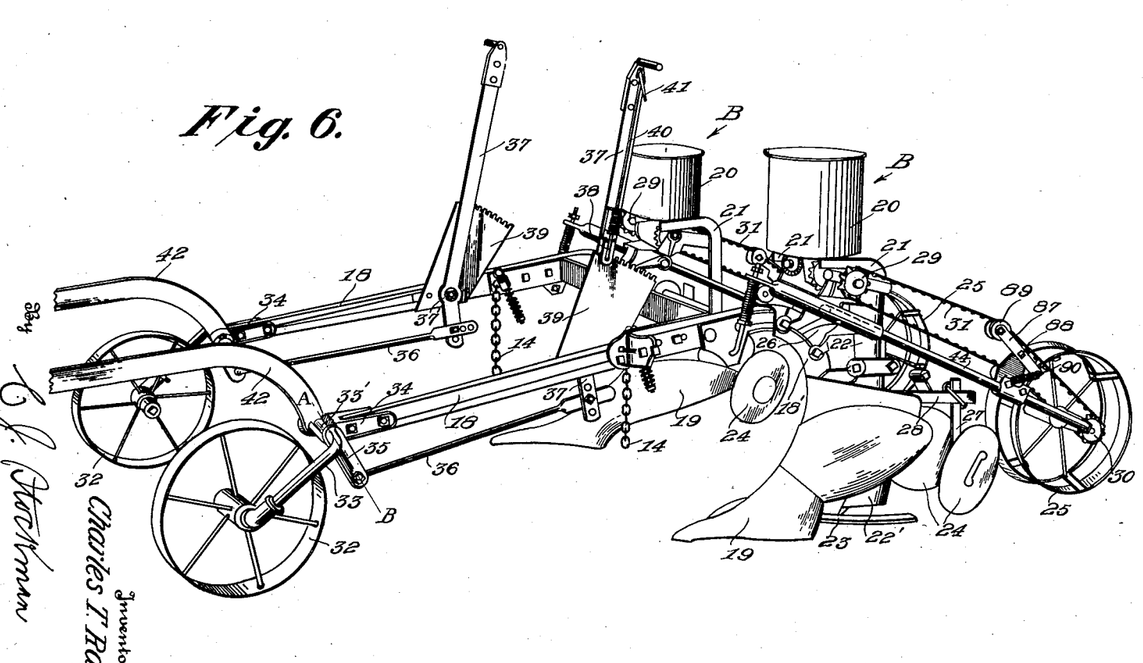
Fig. 6 is a perspective view of the planter, detached from the tractor.

In Fig. 5 the parts are shown in full lines in the positions they occupy when the planting attachments have been lowered to working position and the marker appropriate for the particular operation to be now entered upon has been similarly lowered. The marker at the other side of the implement and which is not to be used in this particular operation is shown in its normally raised position. It will be noticed that the latter marker projects laterally from the implement. There may be times, however, when such lateral projection may be undesirable. Accordingly, I have provided means for holding of both markers with their accompanying arms into the position shown in dot-and-dash outline. To adjust them to the latter position the pins 82 of the body members of the keepers are removed and the arms 61 are swung upward about their pivots at 63 and the latching members 74 also are swung about their pivots at 71. The yokes 62 at the upper ends of the marker-arms 61 are provided with lugs 85 having openings 86. When said arms have been elevated to their referred to positions shown in dot-and-dash outline, these lugs will have entered the openings 76 in the respective keeper bodies and are secured to said keeper bodies by reinserting the pins 82 in their openings in the keeper bodies and through the openings 86 in the lugs 85.

The series of openings 70' provided in each connector 60 permits adjustment of the connector relatively to the projection 68, to take up wear and to insure that proper tension will be imposed on the latching arms 74.

By adjusting the pins 71 in the openings 70', the markers may be lifted upwardly to variable predetermined distances. These will each normally be beyond the position where the latch 79 of the movable member 74 will, with the roller 78, arrest downward movement.

Reverting to the chains 31 which transmit movement from the press wheels 25 to the respective seed dropping mechanisms, it will be noted that tighteners automatically operable to impose yieldable pressure on said chains are provided. Each tightener includes arm 87 which is fulcrumed between its ends at 88 and is provided at one end with a chain engaging member 89 and at its other end with a tensioning spring 90.

Wheels 160, one of which is shown in Fig. 12, may if desired be employed as substitutes for the disc markers 60 hereinbefore described. These wheels when employed will be mounted upon the lower ends of arms 161 which correspond to the arms 61. The means for raising and lowering the wheels 160 are similar to those hereinbefore fully described in relation to the discs. When markers of wheel form, however, are employed in lieu of the discs the one adjusted to marking position will be the one at the side of the tractor over the plowed land and will run in the previously formed furrow to serve as a guide for the operator, who so steers the implement that the marker will run in the center of the furrow.

The angular shape of the arm 161, brings the wheel 160 nearer to the ground than the particular illustration of the arm 61 for the disc 60. In bringing the tractor to a position to start a new row, the operator moves the pedal c downwardly, which starts the soil-treating means downwardly and at the same time starts the marker arm downwardly swinging until the latch of the latching arm 74, catches on the keeper roller 78. This brings the wheel 160 to a point adjacent to but above the ground. This enables the operator when approaching a new path to operate the pedal c to lower the soil-treating means to operative position and to then, at a glance, observe the marker with relation to the furrow, and maneuver the tractor until the marker wheel is in proper relation to the furrow but out of contact therewith.

During this maneuvering the soil-treating devices may be going deeper into the ground, but the marker wheel remains above but adjacent the ground until the operator pulls the cord 83 to release the marker wheel. Upon release, the marker wheel can then drop into its proper position in the furrow. By this construction, the operator (1) saves much time and inaccurate starting of his rows and (2) wear and tear on the marker supporting elements, is lessened.

Having thus described the invention what I believe to be new and desire to secure by Letters Patent, is:

1. A tillage implement including a soil-treating means, movable into and out of operative position with respect to the soil, a marker movable into and out of operative position, a marker-latching means, including a movable member and a second complementary member, connections between said marker and the soil-treating means and also between said marker and the movable member of the latching means, coacting to move the marker to an inoperative position and to move said latching member into a non-full latching position during movement of the soil-treating means to inoperative position, and in position to cause movement of the latching member into full latching position with the complementary member to retain the marker out of operative position on movement of the soil-treating means toward operative position and means operative upon the latching means to release the marker from the complementary member, and thereby permit the return of the same to its operative position after the soil-treating means has been moved to its operative position.

2. A tillage implement including a soil-treating means movable into and out of operative position with respect to the soil, a marker movable into and out of operative position, a marker-latching means including a movable member, connections between said marker and the soil-treating means and also between said marker and the movable member of the latching means, the latching means including a keeper through which the movable member extends and having a member in position to effect latching engagement to arrest movement of the movable member during initial downward movement of the soil-treating means, the said connections coacting to move the marker to an inoperative position and to move said latching member into a non-full latching position during the movement of the soil-treating means to inoperative position and in position to cause movement of the latching member into full latching position to retain said marker out of position on movement of the soil-treating means toward operative position and means operative upon the latching means to release the marker and thereby permit the return of the same to its operative position after the soil-treating means has been moved to its operative position.

3. A tillage implement including a marker provided with a pivoted supporting arm, soil-treating means, means to effect the lowering and raising of the soil-treating means from and into inoperative position, means under control of said lowering and raising means for raising the marker during raising movement imparted to the soil-treating means, means movable into holding relationship with the marker supporting arm for restraining movement of the latter to its operating position, means by which said restraining means is moved into marker restraining position in the movement of the soil-treating means to operative position and means operable to move said restraining means out of its holding relation with the marker supporting arm.

4. A tillage implement comprising a soil-treating means and a marker each movable into and out of operative position, a latching means for holding the marker in inoperative position, said latching means comprising a keeper and a latching arm movable into and out of latching engagement with said keeper, means operative to effect the lowering and raising of the soil-treating means from and into inoperative position with relation to the soil, connections, under control of said raising and lowering means, for moving the marker to inoperative position, above but adjacent the ground in the movement of the soil-treating means to its inoperative position, said connections also effecting latching engagement of said arm with the keeper and permitting movement of the soil-treating means independently of return of the marker to its operative position, and means under control of the operator of the implement and acting with respect to the latching means to release the marker and thereby permit movement of the latter to its operative position, the keeper being provided with a projection and the latching arm being movable within the keeper and relatively to the projection and having a recess to receive said projection, the latching arm being pivoted to permit its recess to be freed from the projection.

5. A tillage implement including soil-treating means, means for raising and lowering the soil-treating means into and from inoperative position, a marker provided with a pivoted supporting arm, a connection between said arm and the means for raising and lowering the soil-treating means, a pivoted and longitudinally movable arm connected to the marker arm and moved longitudinally by the raising movement thereof, a keeper through which said arm has its longitudinal movement and within which it has its pivotal movement, said arm and keeper having elements co-acting to hold them against relative longitudinal movement when the marker arm is in its raised position, and an operator-controlled element connected to the pivoted longitudinally-movable arm for moving said arm pivotally and thereby releasing it from the keeper to permit the marker to drop.

6. A tillage implement including soil-treating means, means for raising and lowering the soil-treating means into and from inoperative position, a marker provided with a pivoted supporting arm having a member extending outward therefrom, a latch arm having one of its ends pivoted to said member, a keeper through which the latch arm has longitudinal movement and within which said arm has pivotal movement, said latch arm and keeper having means co-acting to hold the latch arm against longitudinal movement to thereby hold the marker arm and marker in raised position, a flexible element, a connector between one end of said element and said member, a connection between the other end of said element and the means for raising and lowering the soil-treating means, and an operator-controlled element for releasing the latch arm from the keeper.

7. The combination of a tractor, a plurality of soil-treating means connected thereto, a power lift mechanism under control of the operator of the tractor for raising and lowering said soil treating means by power derived from the tractor, a marker having a supporting arm pivotally connected to the tractor, means under control of the power lift mechanism and connected to said arm for raising the marker to inoperative position during the raising of the soil treating means to their inoperative position, means including a latching arm connected to the marker supporting arm and a keeper coacting with said latching arm, for supporting the marker at a position adjacent but above the ground after the initial downward movement of the soil-treating means and marker, and for holding the marker supporting arms and marker in raised position during the further lowering movement of the soil-treating means and means under control of the operator of the tractor and operative upon the latch arm to release the marker and thereby permit lowering of the marker to operating position.

8. The combination of a tractor, a plurality of seed planters connected thereto, power lift mechanisms under control of the operator of the tractor and operative to effect the lowering and raising of the seed planters from and into their inoperative positions, a pair of markers having supporting members pivotally connected to the tractor, each of said planters having a gage wheel at its forward end and also having a draft member whose rear end is pivotally connected to the forward end of the planter, pivots held against up and down movements relative to the tractor and on which the forward ends of the respective draft members are mounted, levers also mounted on said pivots, links connecting one end of the respective levers with the power lift mechanism, flexible connections between the other ends of the respective levers and the corresponding supporting members of the markers by which the markers are raised when the corresponding levers are swung in one direction, means for restraining downward movement of the markers when said levers are moved in the opposite direction, and means, under control of the operator of the tractor, for releasing said restraining means selectively from the marker supporting members.

9. A tillage implement including a pair of markers, each provided with a pivoted supporting arm movable into a substantially upright position, soil-treating means, operator-controlled means for raising and lowering the soil-treating means into and from inoperative position, means connected to said operator-controlled means and acting upon the marker supporting arms to raise the same to a substantially horizontal position and releasable means operatively connectible to the marker supporting arms for holding the same in either their substantially upright or substantially horizontal positions, at will.

10. A tillage implement including a pair of markers, each provided with a pivoted supporting arm, soil-treating means, operator-controlled means for raising and lowering the soil-treating means into and from inoperative position, means connected to said operator-controlled means for raising the markers to inoperative position, keepers, a pair of latching arms cooperating with the keepers in holding the respective markers in inoperative position, said latching arms respectively having connection with the marker supporting arms to be moved longitudinally relatively to the keepers by movement of said marker supporting arms and also having pivotal movement relatively to the keepers to release them from the latter and said keepers having stops for defining said pivotal movement of the latching arms, said stops being removable to permit the latching arms to be disengaged from the keepers and to be turned into position higher than their said inoperative position and means for holding them in their said higher position.

11. A tillage implement according to claim 10 in which the means for holding the member supporting arms when they have been moved to position higher than their inoperative position comprises lugs which are carried by the marker supporting arms and are releasably connectible to the keepers.

12. The combination of a tractor, soil-treating means connected thereto, a pair of markers having supporting arms pivotally connected to the tractor, means under control of the operator for raising the soil-treating means and the markers to inoperative position by power derived from the tractor, said marker supporting arms mounted to be optionally movable upwardly into a position higher than that to which they are movable by said power, and releasable means for holding them in their said higher position.

13. The combination of a tractor, soil-treating means connected thereto, a pair of markers having supporting arms pivotally connected to the tractor, means under control of the operator of the tractor for raising and lowering the soil-treating means into and from inoperative position by power derived from the tractor, connections between said raising and lowering means and the markers for raising the markers to inoperative position from said means, said connections permitting the soil-treating means to be lowered without affecting the position of the markers, keepers, a pair of latching arms cooperating with the keepers in holding the respective markers in inoperative position, said latching arms respectively having connection with the marker supporting arms and being moved longitudinally into latching engagement with the keepers by raising movement of said marker supporting arms and having pivotal movement relatively to the keepers to release them from the latter.

14. A combination according to claim 13 in which the keepers have stops for defining pivotal movement of the latching arms and said stops are removable to permit the latching arms to be disengaged from the keepers and to be turned into position higher than their said inoperative position and also in which the marker supporting arms are provided with lugs which are arranged to be adjacent the keepers when the latching arms are in their high positions and means are provided for securing said lugs to the keepers.

15. A tillage implement including soil-treating means, a marker, a pivoted supporting arm for the marker and means operatively relatable to said marker supporting arm for holding the marker optionally in either of two inoperative positions with respect to the soil, comprising a stationary keeper and members carried by said arm and optionally engageable with said keeper to cooperate with the latter and the marker supporting arm in holding the marker in its respective inoperative positions.

16. A tillage implement including soil-treating the marker and means operatively relatable to said marker supporting arm for holding the marker optionally in either of two inoperative positions with respect to the soil, comprising a latching arm pivotally connected to the marker supporting arm, a projection carried by said marker supporting arm and a stationary keeper having an opening in which the latching arm is removably mounted when the marker is in one of its inoperative positions and in which said projection is mounted when the marker is in the other of its inoperative positions, and also having a removable element which acts as a stop for the latching arm and as a means for securing said projection to the keeper, in the respective positions of the marker and its supporting arm.

17. A tillage implement comprising soil treating means, a marker, raising and lowering means for moving the soil treating means between working and transport positions of the latter, a movable latch member and its co-operating keeper, and operating connections between said raising and lowering means and the marker and between the marker and said latch member, said connections being arranged to raise the marker simultaneously with raising movement of the soil treating means to transport position and to hold said latching member out of full latching engagement with its keeper when said soil treating means is in transport position and to permit movement of the latching member into full latching engagement with its keeper during the initial part of the movement of the soil treating means to its working position, and operative-controlled means for releasing the latching member from its keeper to permit the marker to move to its downward position.

18. A tillage implement according to claim 17 in which said operating connections include a marker supporting arm and a flexible member having connection with the marker supporting arm and in which said flexible member is taut when said arm is in its raised position, and the latch member has pivotal connection at one end with the marker supporting arm and is provided with a notch, and the keeper has an element which is arranged to enter said notch to be engaged by the rear wall thereof when said latch member is in full latching engagement with the keeper.

19. A tillage implement according to claim 17 in which said marker is disc-shaped and arranged to run upon unplowed land.

20. A tillage implement according to claim 17 in which said marker is a wheel arranged to run in a previously formed furrow.

21. A tillage implement including soil treating means, a pivoted marker supporting arm, means for raising and lowering the soil treating means, connections between said raising and lowering means and the marker supporting arm, operative to raise the latter simultaneously with raising movement imparted to the soil treating means, a latching member and its co-operating keeper, means, including the marker supporting arm, for holding said latching member out of latching engagement with its keeper when the soil-treating means is in non-operating position and for permitting movement of the latching member into latching engagement with its keeper during downward movement of the soil treating means to operative position, and means independent of said raising and lowering means and operable to release the latching member from its keeper to thereby permit the marker supporting arm to return to its downward position.

22. In combination, a tractor, a tillage means including a ground-working element, mechanism, including tractor-operated power means, for raising and lowering the tillage means from and into ground-working position, a marker, a marker supporting arm pivoted to the tractor, a lever pivoted between its ends to the tillage means, operating connections between one end of said lever and the power means and between the other end of said lever and the marker supporting arm, adapted to oscillate said lever simultaneously with the raising and lowering movements of the ground-working element and to impart raising movement to the marker supporting arm in movement of the lever in one direction and permit movement of the lever in the opposite direction without imparting corresponding movement to said arm, means for restraining movement of the marker supporting arm during the latter movement of said lever, and means operable upon said restraining means to release said arm.

23. A tractor-operated tillage implement comprising a tractor, a ground-working element, mechanism, including tractor-operated power means, for raising and lowering said ground-operating element from and into ground-working position, a marker, a marker supporting arm pivoted to the tractor and having a projection intermediate its ends, a lever having movement about a fixed axis at the forward end of the tillage implement, operating connections between one end of said lever and the power means and between the other end of said lever and the projection from the marker supporting arm, adapted to oscillate said lever simultaneously with the raising and lowering movements of the ground-working element and to impart raising movement to the marker supporting arm in movement of the lever in one direction and permit movement of the lever in the opposite direction without imparting corresponding movement to said arm, a latching means, including complementary members one of which is pivoted to the projection from the marker supporting arm, for restraining movement of said arm in the latter movement of said lever and means connected to the pivoted member of the latching means and operable thereon to release the marker supporting arm.

24. A tractor-operated tillage implement according to claim 23 in which the connection between one end of the lever and the projection from the marker supporting arm is of flexible nature.

25. A tractor-operated tillage implement according to claim 23 in which the connection between one end of the lever and the projection from the marker supporting arm is of flexible nature and includes a connector which is selectively settable in different positions to correspondingly vary the length of the connection.

26. In combination, a tractor, tillage means including a ground-working element, means operated by power derived from the tractor for raising and lowering the tillage means from and into ground-working position, a lever pivoted between its ends to said tillage means, a connection between one end of said lever and said power operated means, for moving the lever pivotally simultaneously with the raising and lowering movements imparted to the tillage means, a marker, a marker supporting arm having one of its ends pivoted to the tractor, means connecting the marker supporting arm with the other end of said lever, for raising said arm simultaneously with the raising of the tillage means, a relatively movable latching member and its keeper, a connection between said latching member and arm, the connections between said arm and the lever and latching member being arranged to hold the latching member in non-latching engagement with its keeper when the arm is in fully raised position and to permit movement of said member into latching engagement with the keeper in the initial part of the movement of the lever in the lowering of the tillage means to working position, and means under control of the operator for releasing the latching member from the keeper to thereby permit the marker arm to move to its operative position.

27. In combination, tillage means, a tractor having a swinging arm connected to said tillage means for raising and lowering the same and provided with a plurality of projections, said tractor having means connected to one of said projections and operative under control of the operator of the tractor to swing said arm by power derived from the tractor, a lever pivoted between its ends at the forward end of the tillage means, means connecting one end of said lever with the other of said projections, for moving said lever pivotally in opposite directions while the tillage means is being raised and lowered, respectively, a marker, a marker supporting arm having its upper end pivoted to the tractor, a latching member having one of its ends pivotally connected to the marker supporting arm, means, including a flexible member, connecting the other end of said lever with said arm for raising the latter, said flexible element being arranged to be taut when the marker supporting arm is in its most elevated position, a keeper carried by the tractor and relatively to which the latching member is longitudinally and pivotally movable, said keeper and latching member being arranged to co-act in holding the second arm against downward movement while the tillage means is moving downward into operative position, and means under control of the operator of the tractor for releasing the latching member from its keeper to thereby permit the marker supporting arm to move downward into operative position.

28. A tractor, tillage means, power means deriving movement from the tractor, for raising and lowering the tillage means, a marker, a marker supporting arm, connections between the marker supporting arm and power means for raising the marker to inoperative position sumultaneously with the raising of the tillage means, said connections including a flexible member, and a means connected to the marker supporting arm and operative under control thereof for restraining movement of the marker supporting arm to its operative position during the lowering movement of the tillage means, the connection between the marker supporting arm and the power means including a lever which is pivoted between its ends to have movement about a fixed horizontal axis at the forward end of the tillage means and to one end of which the flexible element is connected, the other end of said lever having connection with the power means.

29. In combination, a tractor, soil treating means connected thereto, a marker having a supporting arm pivoted to the tractor, power lift means for simultaneously lifting the soil treating means to inoperative position and the marker to inoperative position above but adjacent to the ground, independent manually operated means for releasing the marker at will for engagement with the ground and additional means for securing the marker supporting arm in a higher position for road transport.

30. In combination, a tractor, soil-treating means connected thereto, a marker having a supporting arm pivoted to the tractor and power lift means for simultaneously lifting the soil-treating means and markers to inoperative position, the power lift means being provided with adjustable connections to predeterminedly vary the height to which the marker is lifted relative to the soil working means.

31. In combination, a tractor, a soil-treating means connected thereto, a marker having a supporting arm pivoted to the tractor, power lift means for simultaneously lifting the soil-treating means and markers to inoperative position, the power lift means being provided with adjustable connections to predeterminedly vary the height to which the marker is lifted relative to the soil working means and releasing means to return the soil-treating means to operative position and to release the marker for gravitational movement toward operative position and releasable means for arresting the downward movement of the marker at a point adjacent to but above the ground.

32. In combination, a tractor, soil-treating means connected thereto, a marker having a supporting arm pivoted to the tractor and power lift means for simultaneously lifting the soil-treating means to inoperative position and the marker to inoperative position above but adjacent to the ground, the power lift means being provided with adjustable connections to predeterminedly vary the height to which the marker is lifted relative to the soil-working means.

33. In combination, a tractor, soil-treating means connected thereto, a marker having a supporting arm pivoted to the tractor, power lift means for simultaneously lifting the soil-treating means and marker to inoperative position, the power lift means being provided with adjustable connections to predeterminedly vary the height to which the marker is lifted relative to the soil-working means, said connections operating to hold the marker in its upper predetermined position and releasing the marker for downward gravitational movement during a portion of the downward movement of the soil-treating means and a stop releasable at the will of the operator for arresting the downward movement of the marker at a point above the ground.

CHARLES T. RAY.